(12) United States Patent
Al-Garni et al.

(10) Patent No.: US 8,857,758 B2
(45) Date of Patent: Oct. 14, 2014

(54) LIGHTER-THAN-AIR VEHICLE FOR SHADING

(75) Inventors: Ahmed Z. Al-Garni, Dhahran (SA); Ayman H. Kassem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 633 days.

(21) Appl. No.: 13/226,382

(22) Filed: Sep. 6, 2011

(65) Prior Publication Data

US 2011/0315811 A1 Dec. 29, 2011

Related U.S. Application Data

(63) Continuation-in-part of application No. 12/153,259, filed on May 15, 2008, now abandoned.

(51) Int. Cl.
*B64B 1/06* (2006.01)
*B64B 1/02* (2006.01)
*B64B 1/00* (2006.01)
*A45B 23/00* (2006.01)

(52) U.S. Cl.
CPC ......... *A45B 23/00* (2013.01); *A45B 2200/1027* (2013.01); *B64B 1/00* (2013.01); *A45B 2023/0006* (2013.01); *A45B 2200/1045* (2013.01); *A45B 2200/1009* (2013.01); *A45B 2023/0093* (2013.01)
USPC .......................................................... 244/30

(58) Field of Classification Search
USPC ........................................ 244/24–31, 33, 96
See application file for complete search history.

(56) References Cited

U.S. PATENT DOCUMENTS

| | | | |
|---|---|---|---|
| 2,411,316 A | 11/1946 | Capita | |
| 3,184,742 A | 5/1965 | Cutler | |
| 4,160,523 A | 7/1979 | Stevens | |
| 4,257,199 A | 3/1981 | Kuboyama | |
| 4,643,210 A | 2/1987 | Feld | |
| 4,662,127 A | 5/1987 | Glode | |
| 4,811,920 A | 3/1989 | Askwith et al. | |
| 5,076,029 A | 12/1991 | Sevilla | |
| 6,116,538 A | 9/2000 | Hafelfinger | |
| 6,282,842 B1 | 9/2001 | Simens | |
| 6,571,815 B1 | 6/2003 | Hill | |
| 6,588,702 B2 | 7/2003 | Robbins | |
| 6,739,725 B2 | 5/2004 | Ben-Ari | |
| 6,925,949 B1 | 8/2005 | Phillips | |
| 7,036,768 B2 | 5/2006 | Bundo | |
| 7,073,749 B2 | 7/2006 | Krill et al. | |
| 7,093,789 B2 | 8/2006 | Barocela et al. | |
| 7,137,592 B2 | 11/2006 | Barocela et al. | |
| 7,249,733 B2 * | 7/2007 | Palmer | 244/30 |

(Continued)

*Primary Examiner* — Philip J Bonzell
(74) *Attorney, Agent, or Firm* — Richard C. Litman

(57) ABSTRACT

The lighter-than-air vehicle for shading is an airborne, movable system that provides shade from the sun for an open area. The vehicle is a substantially flat flying device having upper and lower surfaces, and which is filled with a lighter-than-air gas or gases, such as helium or hydrogen. The vehicle may be tethered to the ground through control wires, or may be fully autonomous and controlled by propeller fans. The required power may be provided by wire from ground, or through a portable power source, such as solar cells, mounted atop of vehicle. The vehicle has sun sensors that allow it to track the sun, and provides around the clock shaded area underneath its surface. The vehicle can also have pressure sensors and altitude sensors that may trigger an alarm in case of an emergency descent to the ground.

16 Claims, 12 Drawing Sheets

(56) References Cited

U.S. PATENT DOCUMENTS

| | | | |
|---|---|---|---|
| 7,464,895 B2 * | 12/2008 | Palmer | 244/30 |
| 7,726,601 B2 * | 6/2010 | Hershkovitz | 244/30 |
| 2002/0003189 A1 | 1/2002 | Kuenkler | |
| 2002/0179770 A1 | 12/2002 | Liss | |
| 2003/0127560 A1 | 7/2003 | Liss | |
| 2004/0065773 A1 * | 4/2004 | Morales | 244/30 |
| 2006/0060695 A1 | 3/2006 | Walden | |
| 2006/0207730 A1 | 9/2006 | Berman | |
| 2007/0138336 A1 * | 6/2007 | Palmer | 244/30 |
| 2007/0235583 A1 * | 10/2007 | Palmer | 244/30 |
| 2008/0030884 A1 * | 2/2008 | Hershkovitz | 359/871 |

\* cited by examiner

LIGHTER-THAN-AIR VEHICLE FOR SHADING

CROSS-REFERENCE TO RELATED APPLICATION

This application is a continuation-in-part of U.S. patent application Ser. No. 12/153,259, filed May 15, 2008.

BACKGROUND OF THE INVENTION

1. Field of the Invention

The present invention relates to lighter-than-air aircraft, balloons, or similar structures, and particularly to a lighter-than-air vehicle for shading that is useful in shading open areas in hot climate regions, and has special use for shading a moving crowd.

2. Description of the Related Art

Countries near the equator have hot climates, and may also have large desert regions. Although many forms of clothing have been adapted for wear in such regions, it is often desirable to have shade from the sun. Further, in some cases, a permanent structure is not necessary, but temporary shade will do. Canopies and tents can be used for this purpose, but canopies and tents require labor in the hot sun to set up and break down. Moreover, canopies and tents are stationary, and sometimes are too small to provide coverage for a large crowd.

There is a need for a mobile source of shade for hot or desert areas that can be used to provide temporary shade or relief from the hot sun for small groups of people or for crowds. Thus, a lighter-than-air vehicle for shading solving the aforementioned problems is desired.

SUMMARY OF THE INVENTION

The lighter-than-air vehicle for shading is an airborne, movable system that provides sunshade for an open area. The vehicle is a substantially flat flying device having upper and lower surfaces, and which is filled with a lighter-than-air gas or gases, such as helium or hydrogen. The vehicle may be tethered to the ground through control wires, or may be fully autonomous and controlled by propeller fans. The required power may be provided by wire from ground, or through a portable power source, such as solar cells, mounted atop the vehicle. The vehicle has sun sensors that allow it to track the sun, and provides around the clock shaded area underneath its surface. The vehicle can also have pressure sensors and altitude sensors that may trigger an alarm in case of an emergency descent to the ground.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
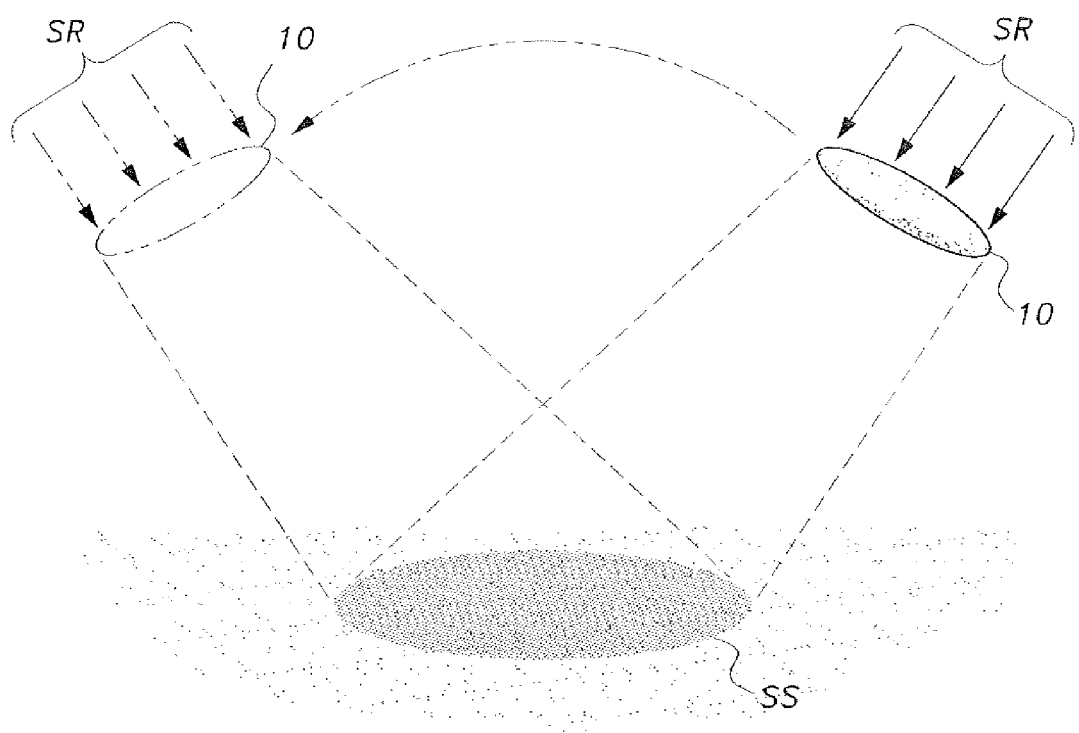
FIG. 1 is a diagrammatic view showing shading provided by a lighter-than-air vehicle for shading according to the present invention.
Figure 2A:
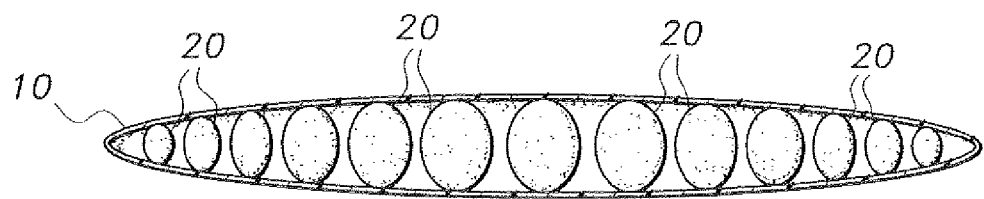
FIG. 2A shows a front view in section of the lighter-than-air vehicle for shading according to the present invention.
Figure 2B:
FIG. 2B shows a side view of the lighter-than-air vehicle for shading according to the present invention.
Figure 2C:
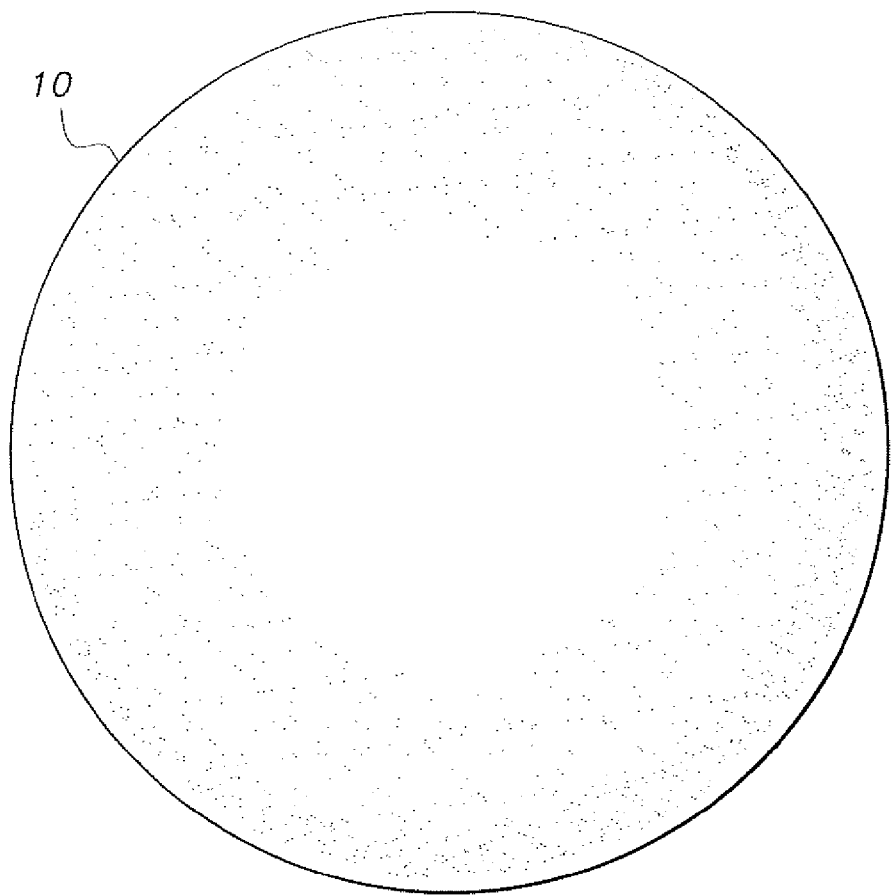
FIG. 2C shows a top view of the lighter-than-air vehicle for shading according to the present invention.
Figure 8:
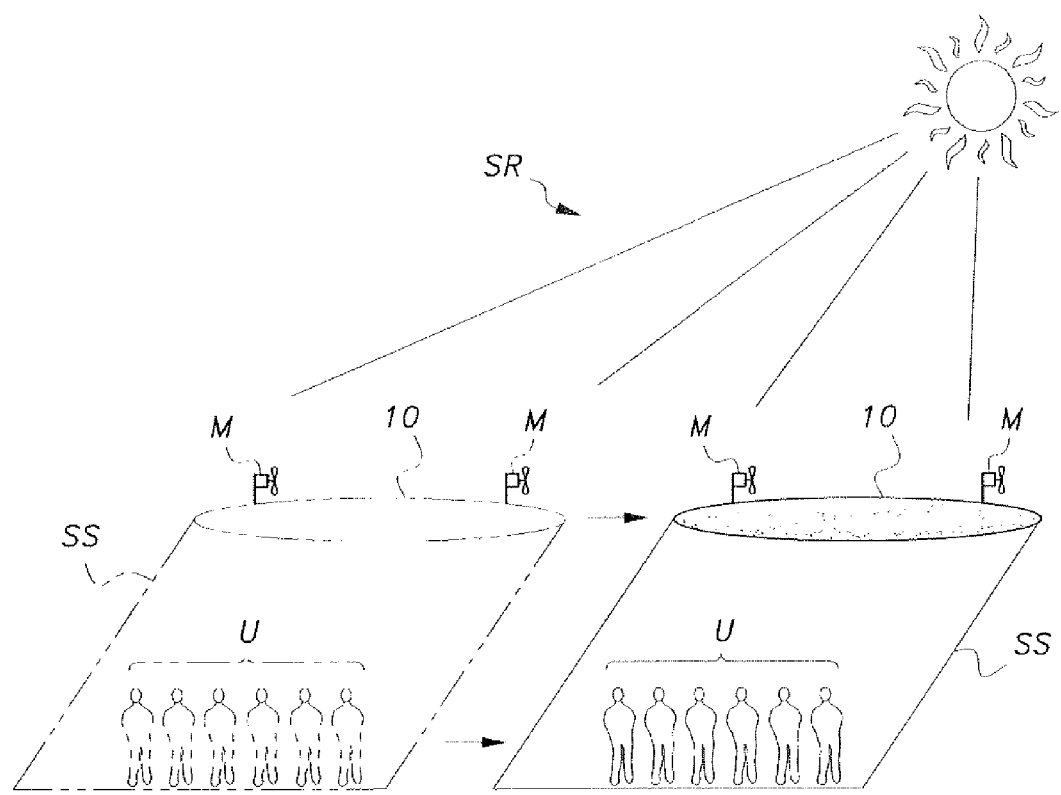
FIG. 8 is a diagrammatic view of the lighter-than-air vehicle for shading according to the present invention, showing shade provided by the vehicle following a crowd after movement of the crowd.

As shown in FIGS. 1 and 8, the present invention relates to a lighter-than-air vehicle for shading that provides an airborne, movable system for shade from the sun in an open area. As shown in FIGS. 1-2C, the lighter-than-air vehicle 10 is ellipsoidal or discoidal, having substantially flat upper and lower surfaces that enclose either a manifold or single chamber filled with a lighter-than-air gas or gases, or a hollow interior housing a plurality of gas bags or chambers 20 containing a lighter-than-air gas or gases, such as hydrogen, helium, argon, or the like. When the gas bags 20 are unfilled, the material of vehicle 10 is sufficiently flexible that it can be collapsed and folded over for compact storage and/or transport in, e.g., a light duty truck. The ellipsoidal or discoidal shape is aerodynamically efficient, being streamlined for reducing wind drag.

Figure 6A:
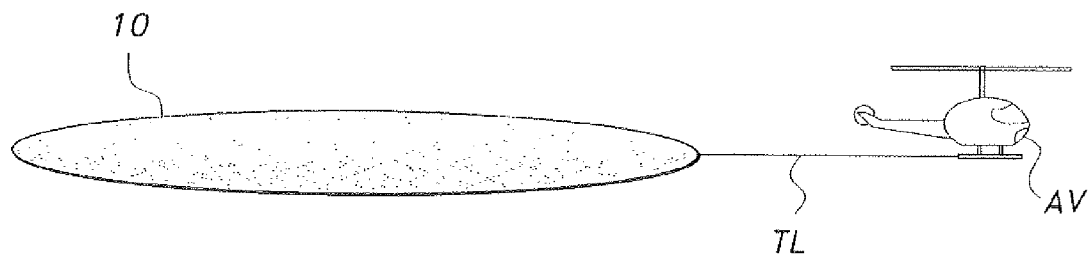
FIG. 6A is a diagrammatic view of the lighter-than-air vehicle for shading according to the present invention, shown being towed by a helicopter.
Figure 6B:
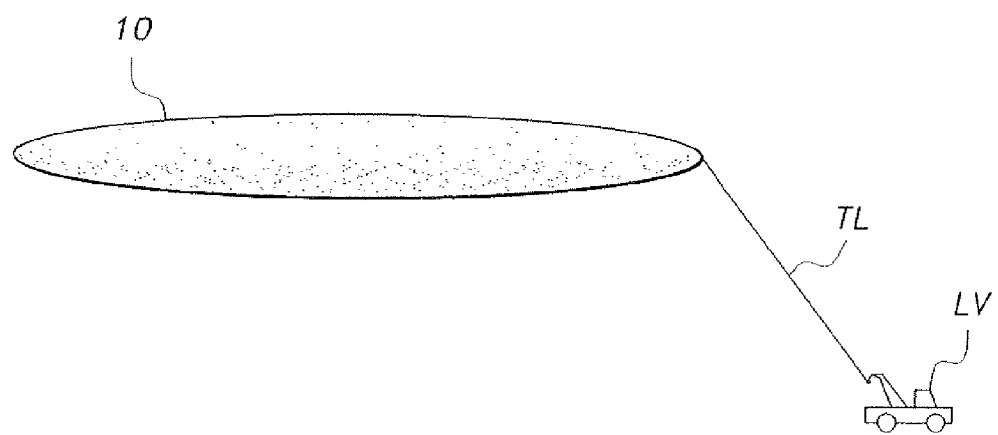
FIG. 6B is a diagrammatic view of the lighter-than-air vehicle for shading according to the present invention, shown being towed by a truck or other ground vehicle.

Moreover, when the gas bags 20 are filled and the vehicle 10 is deployed in the configuration shown in FIGS. 6A and 6B, a tow line TL may be attached to the vehicle 10 so that the balloon 10 can be towed by an aircraft, such as helicopter AV, or a land vehicle, such as tow truck LV. Exemplary material of vehicle 10 can be a simple net covered with continuous sheets of plastics to give shape while maintaining a low weight. The cover material may have rigid portions that can be used for attachment of motors and propellers to vehicle 10. The upper cover sheet may be painted in a bright reflecting color to reflect the sun rays and reduce heat. The lower cover may have electrically lighted signs to guide a crowd sheltering under the vehicle 10, or to give the crowd instructions. The lower surface can also be used for advertising. As most clearly shown in FIGS. 1 and 8, the discoidal shape of vehicle 10 can block impinging sun rays SR to create a shade surface SS on the ground to protect a crowd of people, such as crowd U.

Figure 3:
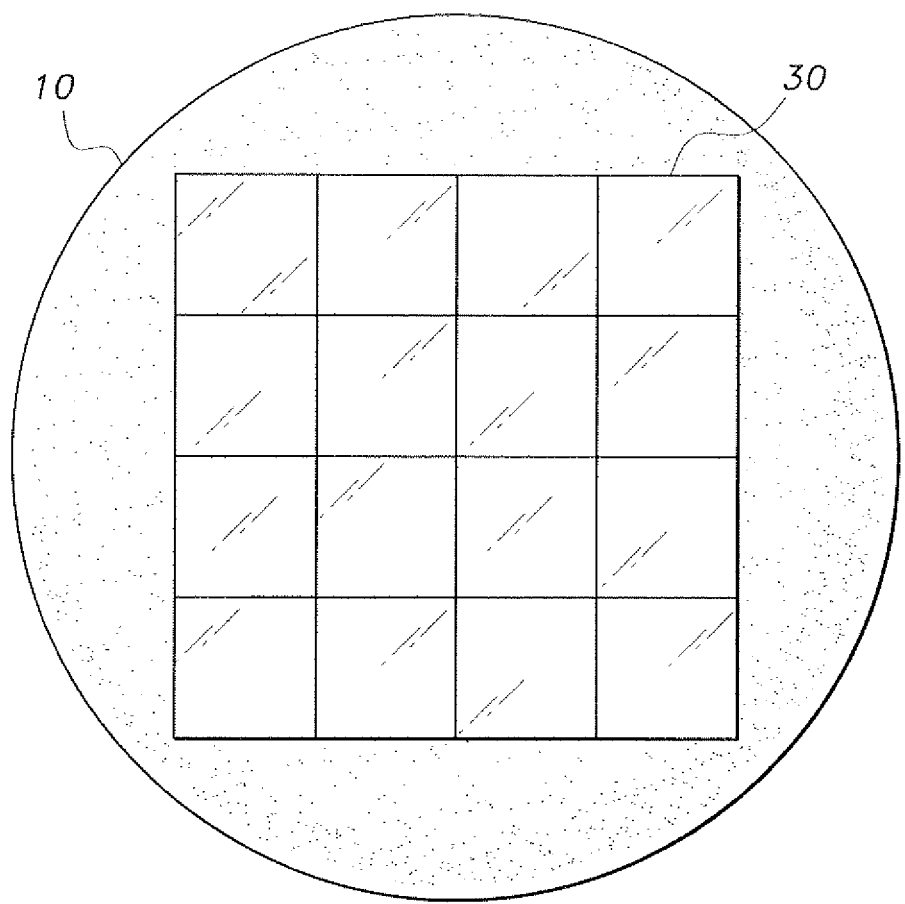
FIG. 3 is a top view of the lighter-than-air vehicle for shading according to the present invention, showing an exemplary, optional solar cell configuration.

Under external control, or autonomously, the vehicle 10 tracks movement of the sun through the sky to maintain the shade surface SS on the ground. As shown in FIG. 3, control mechanisms employed by vehicle 10 may be powered by solar cells 30, which are preferably disposed on a top surface of vehicle 10. Alternatively, batteries may power the vehicle 10, or the solar cells 30 may be used in conjunction with rechargeable batteries. Small fans can be put on the surface of vehicle 10, where the air velocity is maximum, the fans being used as windmills to generate power for recharging the batteries.

Figure 4A:
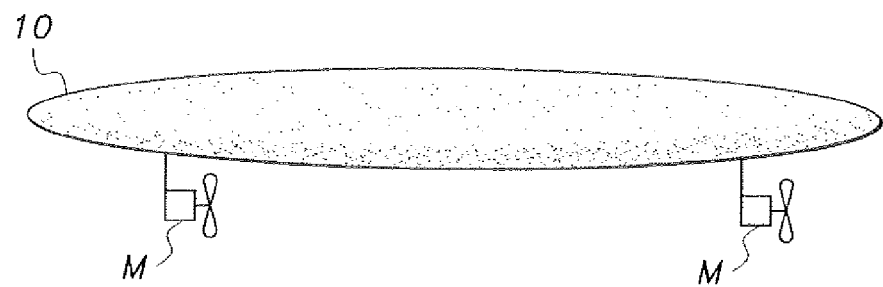
FIG. 4A is a side view of the lighter-than-air vehicle for shading according to the present invention, showing optional thrust motors disposed below the vehicle for navigation of the vehicle.
Figure 4B:
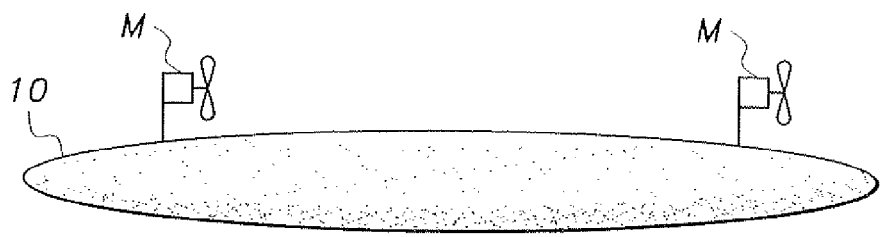
FIG. 4B is a side view of the lighter-than-air vehicle for shading according to the present invention, showing optional thrust motors disposed above the vehicle for navigation of the vehicle.
Figure 4C:
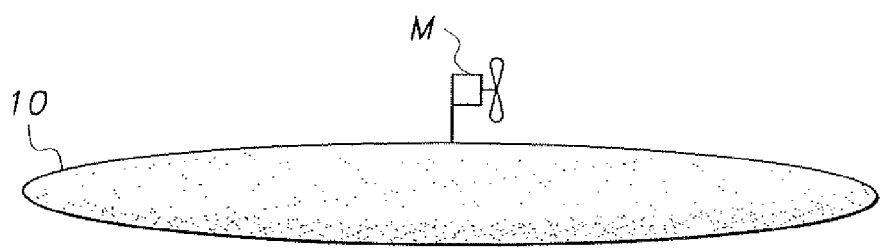
FIG. 4C is a side view of the lighter-than-air vehicle for shading according to the present invention, showing an optional centrally disposed thrust motor disposed above the vehicle for navigation of the vehicle.
Figure 4D:
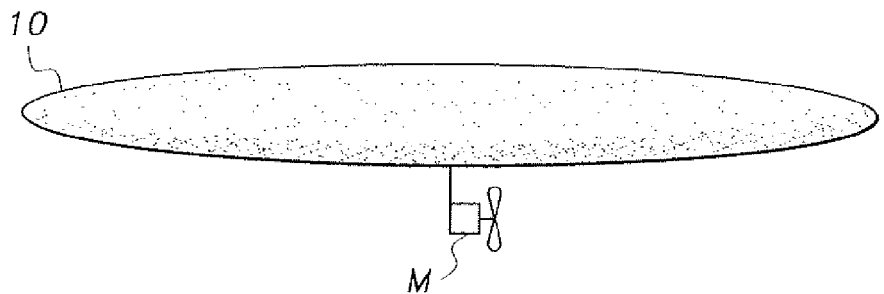
FIG. 4D is a side view of the lighter-than-air vehicle for shading according to the present invention, showing an optional centrally disposed thrust motor disposed below the vehicle for navigation of the vehicle.

As shown in FIGS. 4A-4D, various combinations utilizing propeller motors M may be disposed on lighter-than-air vehicle 10 for use in navigating the vehicle 10. FIG. 4A shows the propeller systems M being disposed on the lower surface of vehicle 10, proximate the periphery of the lower surface. FIG. 4B shows the propeller motors M being disposed on the upper surface of vehicle 10 proximate the periphery of the upper surface. FIG. 4C shows a single propeller motor M disposed on the upper surface of vehicle 10 proximate a central vertical axis of the vehicle 10. FIG. 4D shows a single propeller motor M disposed on the lower surface of vehicle 10 proximate a central vertical axis of the vehicle 10. Upper surface configurations of propeller motors M are preferred for safety in case of crashing of the vehicle and falling on people below the vehicle 10. Preferably the propeller motors M are electrically driven.

Figure 7:
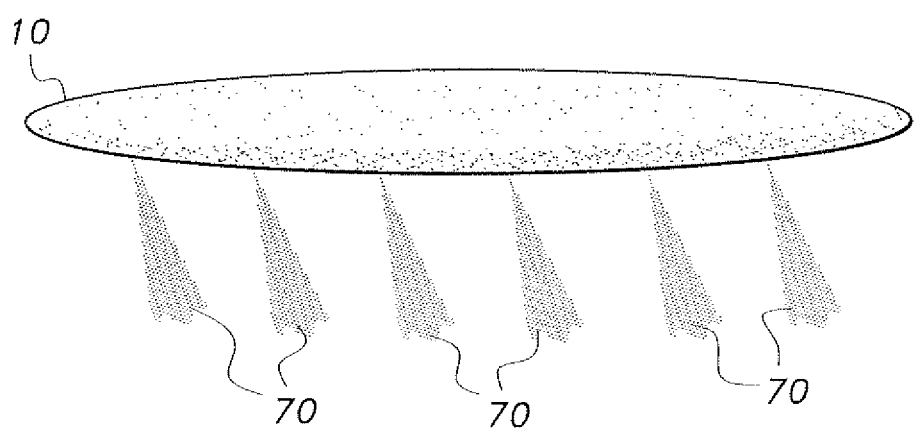
FIG. 7 is a diagrammatic view of the lighter-than-air vehicle for shading according to the present invention, showing a pattern of atomizers spraying a mist of water towards the ground.

As shown in FIG. 7, cold water atomizers 70 may be disposed on the lower surface of the vehicle 10. The cold water atomizers 70 spray cold water downward into a shaded area, and can reduce ambient air temperature in the area shaded by vehicle 10.

Figure 5:
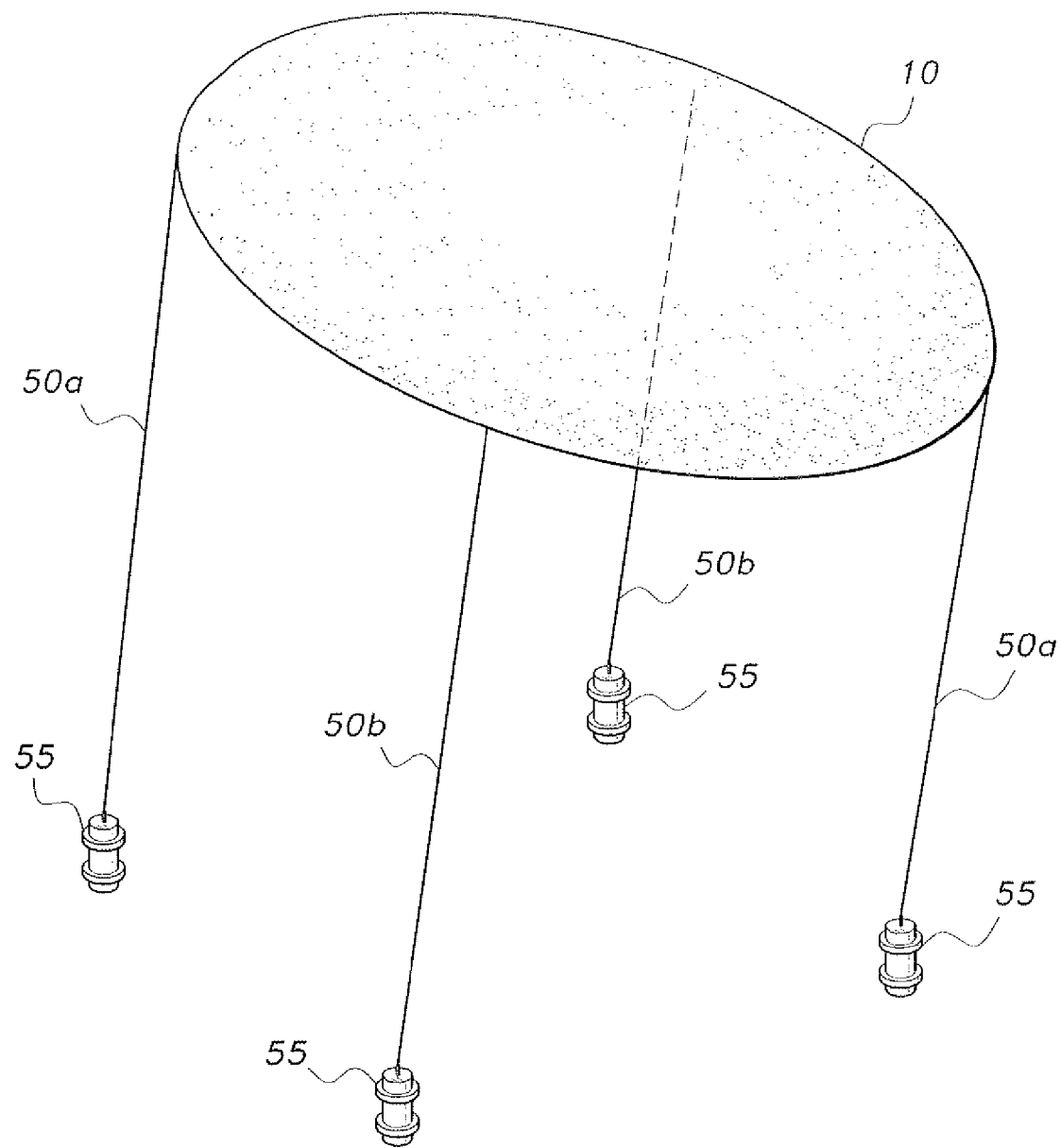
FIG. 5 is a diagrammatic view of a lighter-than-air vehicle for shading according to the present invention, shown tethered to the ground.

As shown in FIGS. 5 and 8, the vehicle 10 may be connected to the ground through control wires 50a and 50b, or the vehicle 10 may be fully autonomous and controlled by the propeller motors M. The altitude of balloon 10 can be controlled by ground control lines, which may be used to control mechanical or electrical navigational devices, or by a pump that controls the gas pressure inside the vehicle 10. FIG. 5 shows an exemplary control line configuration comprising control lines 50a extending from a first axis of the vehicle 10 and control lines 50b extending from a second axis of the vehicle 10, the second axis preferably being orthogonal to the first axis. Control motors 55 on the ground are configured to pay out or reel in control lines 50a and 50b as required. Control lines 50a and 50b can be used for initial anchoring, inclination angle, direction, movement and landing of vehicle 10.

The vehicle 10 may have sun sensors, which allow the vehicle 10 to track the sun in order to provide a shade area underneath the vehicle surface for the duration of sunlight. The vehicle 10 also may have pressure sensors and altitude sensors that can trigger an alarm in case of an emergency descent to the ground.

The vehicle 10 is preferably an unmanned vehicle, balloon, or drone controlled either mechanically by tether lines or electrically by remote control used to alternately apply thrust to the propeller motors, to operate other navigational control devices, or to control valves regulating pressure in the gas chamber(s).

Figure 10:
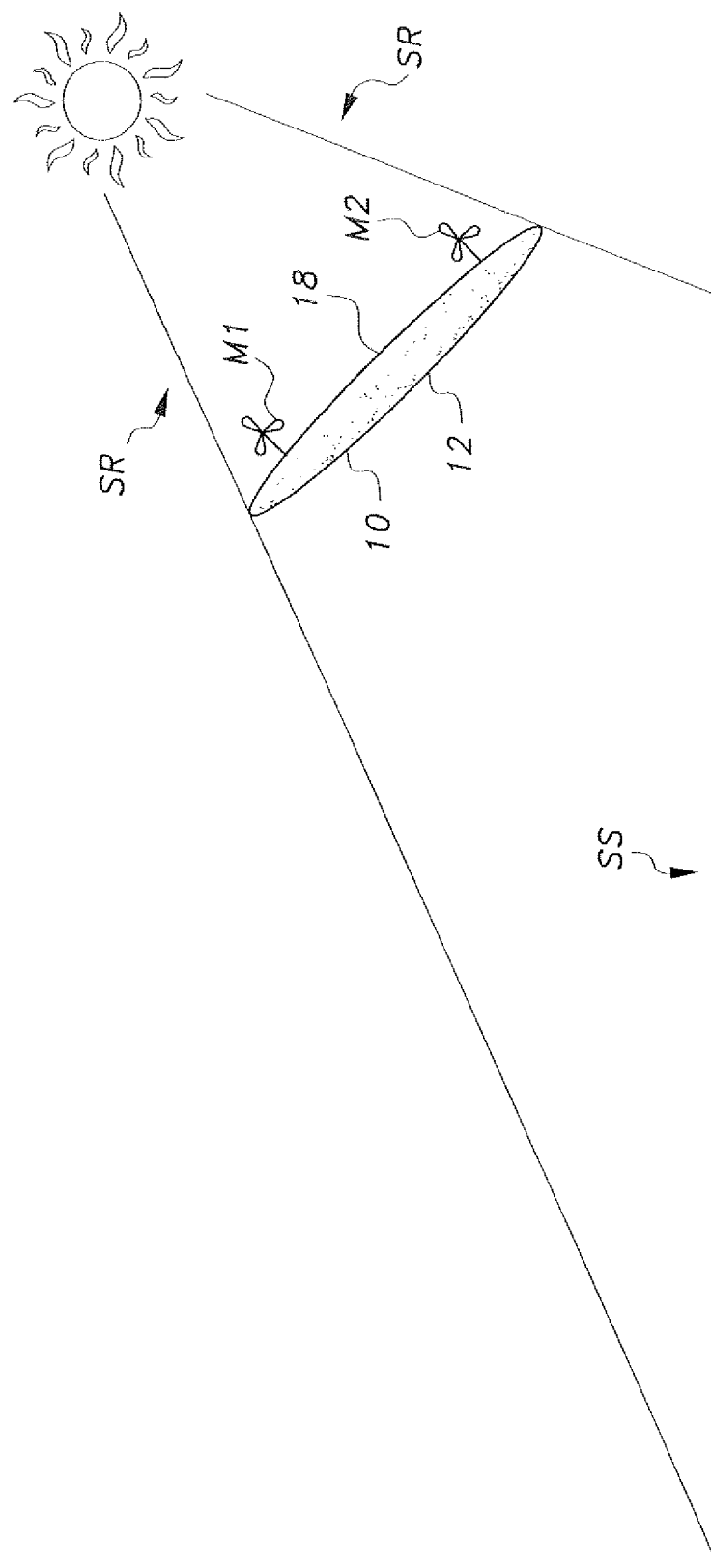
FIG. 10 is a diagrammatic view of the lighter-than-air vehicle of FIG. 9, particularly illustrating tilting of the vehicle with respect to the horizontal.

In the embodiment of FIG. 10, a pair of propeller motors M1, M2 are mounted on the upper surface 18 of vehicle 10, similar to the embodiment of FIG. 4B. However, the propeller motors M1 and M2 are under separate control, allowing motors M1 and M2 to operate at different speeds. In the configuration shown in FIG. 10, propeller motor M1 is operating at a faster rate of speed than propeller motor M2. The greater speed of motor M1 causes a decrease in pressure on the left side of the upper surface 18 (in the configuration illustrated in FIG. 10) compared to the pressure of air blowing on the right side of the upper surface 18 (blown by motor M2). This causes the vehicle to tilt relative to the horizontal, as shown, thus increasing the surface area of shade surface SS.

Figure 9:
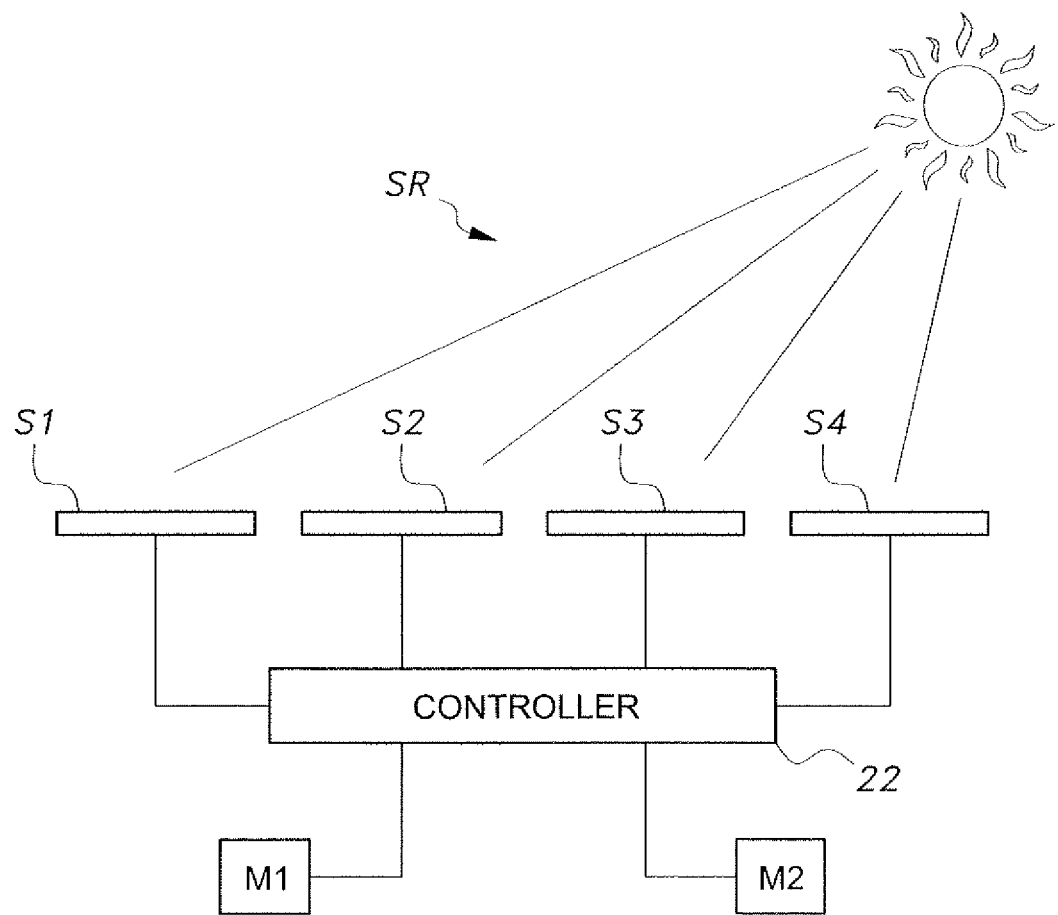
FIG. 9 diagrammatically illustrates an alternative embodiment of a lighter-than-air vehicle for shading according to the present invention, particularly illustrating differing intensities of light impinging upon individual solar cells thereof.

Any suitable type of sensor or tracker may be utilized for following the path of the sun and adjusting the output of propeller motors M1 and M2 accordingly to maintain the maximum area of shade surface SS. For example, as shown in FIG. 9, individual solar cells S1, S2, S3 and S4 of the solar panel array 30 of FIG. 3 each receive a different intensity of solar radiation SR when the solar panel array 30 is oriented horizontally and the sun is positioned at an angle relative to the array 30, instead of being directly overhead. It should be understood that the differing intensity (illustrated by the increased length of each individual ray) is exaggerated in FIG. 9 for illustrative purposes.

The difference in intensity causes a difference in current generated by each of the individual solar cells S1, S2, S3, S4, which can be measured by an ammeter or the like. Output current from the individual solar cells S1, S2, S3, S4 is received by a controller 22, which may be any suitable type of control circuit, processor, programmable logic controller or the like, which calculates the appropriate speed for motor M1 and motor M2 to tilt vehicle 10 to maximize the area of shade surface SS; i.e., when the output of individual solar cells S1, S2, S3, S4 are all equal. An ammeter, comparator, or the like may be integrated into the controller 22.

Figure 11:
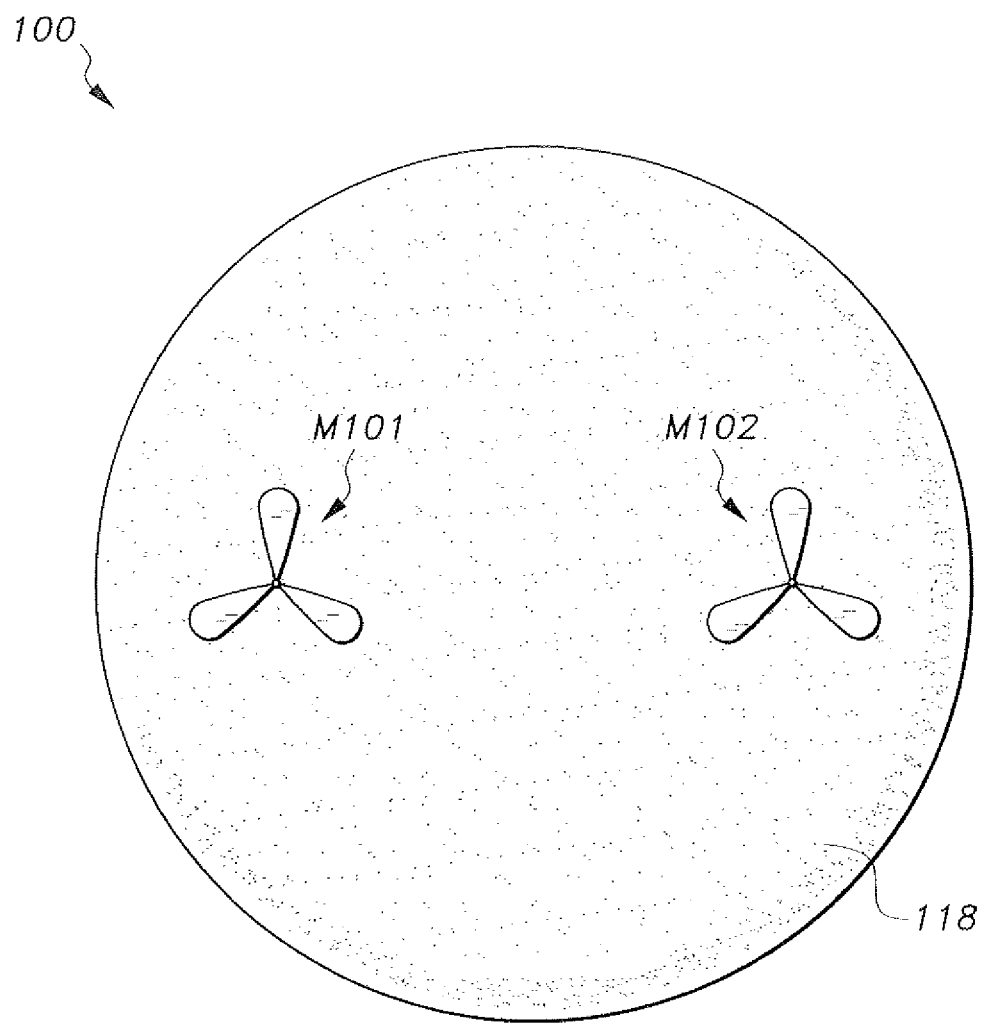
FIG. 11 is a top view of an alternative embodiment of a lighter-than-air vehicle for shading according to the present invention.

Alternatively, as shown in the embodiment of FIG. 11, the lighter-than-air vehicle 100 may include a main body similar to that described above, but with a pair of helicopter-type propeller motors M101, M102 mounted to an upper surface 118. As opposed to the propeller orientation shown in FIGS. 4A-4D (i.e., with the propellers spinning in a plane orthogonal to the horizontal or major axis of vehicle 10), the propeller-type motors M101, M102 have a propeller orientation allowing the propellers to spin in a plane that is parallel to the horizontal or the central plane of the vehicle body. Under separate control, as described above with regard to FIGS. 9 and 10, the two motors M101, M102 can create uneven lift to similarly tilt the vehicle 100.

Figure 12:
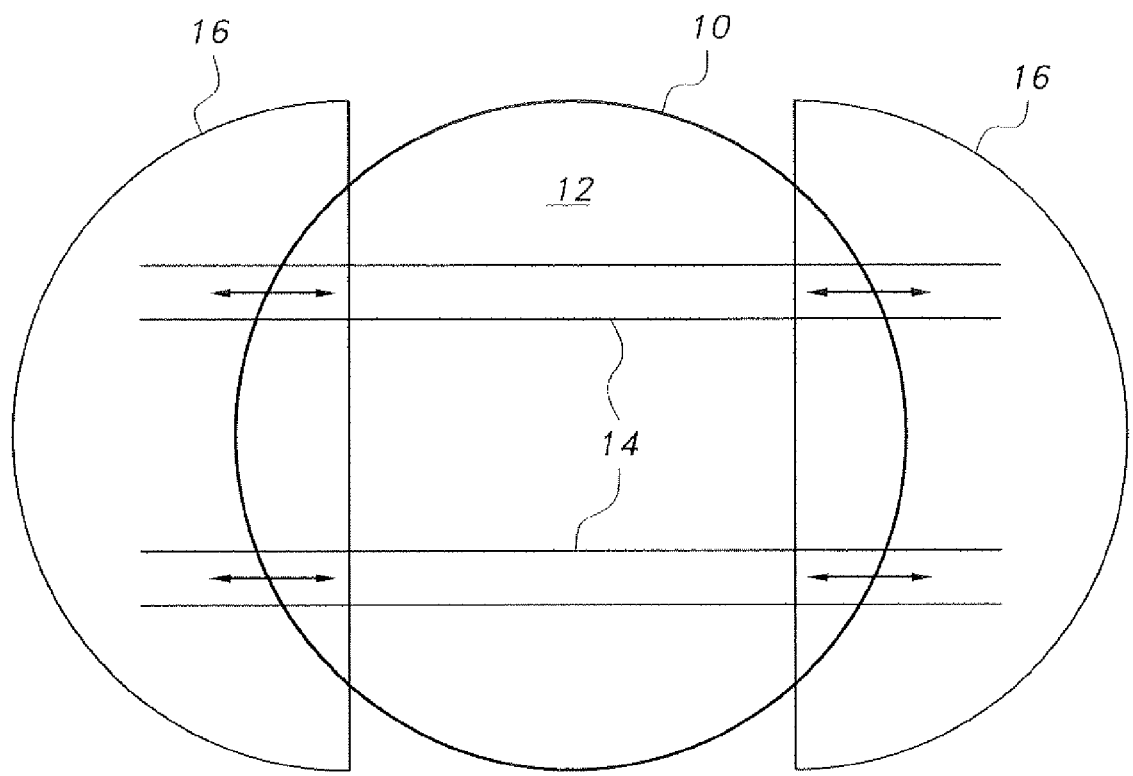
FIG. 12 is a bottom view of another alternative embodiment of a lighter-than-air vehicle for shading according to the present invention.

In the further alternative embodiment of FIG. 12, a pair of retractable awnings 16 are slidably mounted to the lower surface 12 of the lighter-than-air vehicle 10. The retractable awnings 16 may be mounted on tracks 14, as shown. It should be understood that any suitable type of slidable mounting may be utilized for the sliding attachment of awnings 16 to the lower surface 12. Further, it should be understood that the awnings 16 may be manually extended and retracted, or may be automatically extended and retracted through the use of any suitable type of drive, such as motors, linear actuators or the like. The drive may be under control of controller 22.

Preferably, the vehicle 10 is provided with a leakage monitor, allowing the controller 22 to either drive motors M1, M2 faster upon detection of a leak (to increase lift), or to move the vehicle 10 to a safe location for landing. Any suitable type of pressure or leak monitor may be utilized.

It is to be understood that the present invention is not limited to the embodiments described above, but encompasses any and all embodiments within the scope of the following claims.

We claim:

1. A lighter-than-air vehicle for shading, comprising:
    a discoidal body having substantially flat upper and lower surfaces;
    at least one chamber disposed within the discoidal body;
    at least one propeller motor disposed on the discoidal body, the propeller motor providing thrust for vehicle navigation;
    means for selectively tilting the discoidal body with respect to horizontal; and
    lighter-than-air gas disposed within the at least one chamber, the lighter-than-air gas providing the discoidal body with sufficient buoyancy to elevate the discoidal body aboveground in order to provide shade in a selected area from direct sunlight; and
    means for detecting a relative position of the sun with respect to the discoidal body; and
    means for automatically actuating the means for tilting in response to the means for detecting in order to provide a maximum surface area of shade.

2. The lighter-than-air vehicle according to claim 1, further comprising at least one control line attached to the vehicle, the control line tethering said discoidal body to the ground.

3. The lighter-than-air vehicle according to claim 1, wherein the discoidal body is collapsible for compact storage.

4. The lighter-than-air vehicle according to claim 1, further comprising a tow line attached to said discoidal body, whereby the vehicle may be towed to a designated shade.

5. The lighter-than-air vehicle according to claim 1, wherein said discoidal body is a streamlined in order to reduce wind drag.

6. The lighter-than-air vehicle according to claim 1, further comprising a plurality of atomizers disposed on the lower surface of said discoidal body for dispensing a cold water mist towards ground.

7. The lighter-than-air vehicle according to claim 1, wherein the at least one propeller motor is mounted on the upper surface of the discoidal body.

8. The lighter-than-air vehicle according to claim 7, further comprising a plurality of solar cell panels electrically connected to said at least one propeller motor for furnishing power to said motors.

9. The lighter-than-air vehicle according to claim 8, wherein said at least one propeller motor comprises at least two propeller motors.

10. The lighter-than-air vehicle according to claim 9, wherein said means for detecting a relative position of the sun comprises means for discriminating sunlight intensity impinging on each of said plurality of solar cell panels.

11. The lighter-than-air vehicle according to claim 10, wherein:
    said means for selectively tilting the discoidal body comprises a thrust controller to adjust thrust generated by each of said at least two propeller motors; and
    said means for automatically actuating the means for tilting comprises a comparator circuit in the thrust controller for comparing current generated by each of said solar cell panels and computing the corresponding area of shade provided by said discoidal body, the controller adjusting relative thrust of said propeller motors to tilt said discoidal body to maintain the maximum area of shade.

12. The lighter-than-air vehicle according to claim 1, further comprising at least one retractable awning mounted to the lower surface of said discoidal body.

13. The lighter-than-air vehicle according to claim 12, further comprising means for selectively deploying the at least one retractable awning.

14. A method of providing shade from the sun in a desert area, comprising the steps of:
    casting an area of shade onto the desert area with a vehicle having a discoidal body containing lighter-than-air gas rendering the discoidal body airborne; and
    tilting the discoidal body with respect to the horizontal dependent upon a relative position of the sun with respect to a selected area in order to provide a maximum surface area of shade.

15. The method of providing shade according to claim 14, further comprising the step of selectively activating thrust motors attached to the discoidal body to move the area of shade cast by the discoidal body from one location to another location.

16. The method of providing shade according to claim 14, further comprising the step of towing the discoidal body to move the area of shade cast by the discoidal body from one location to another location.

\* \* \* \* \*